US012506289B2

(12) United States Patent
Ashibu

(10) Patent No.: US 12,506,289 B2
(45) Date of Patent: Dec. 23, 2025

(54) CONNECTION STRUCTURE WITH IMPROVED CONTACT RELIABILITY

(71) Applicant: JAPAN AVIATION ELECTRONICS INDUSTRY, LTD., Tokyo (JP)

(72) Inventor: Kenta Ashibu, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 292 days.

(21) Appl. No.: 18/170,036

(22) Filed: Feb. 16, 2023

(65) Prior Publication Data

US 2023/0344161 A1 Oct. 26, 2023

(30) Foreign Application Priority Data

Apr. 25, 2022 (JP) ................................ 2022-071296

(51) Int. Cl.
*H01R 13/187* (2006.01)
*H01R 13/04* (2006.01)
*H01R 101/00* (2006.01)

(52) U.S. Cl.
CPC ........... *H01R 13/187* (2013.01); *H01R 13/04* (2013.01); *H01R 2101/00* (2013.01)

(58) Field of Classification Search
CPC .. H01R 13/187; H01R 13/113; H01R 13/115; H01R 13/05; H01R 13/052; H01R 4/48; H01R 13/02; H01R 13/2492; H01R 13/23; H01R 13/04; H01R 13/62
USPC ................ 439/845, 886, 849, 850, 692, 670
See application file for complete search history.

(56) References Cited

U.S. PATENT DOCUMENTS 5,281,178 A * 1/1994 Biscorner ............ H01R 13/052 439/850
9,166,348 B2 * 10/2015 Burris ................ H01R 13/5202
2011/0203838 A1 * 8/2011 MacDougall ........ H05K 3/3436 174/257

(Continued)

FOREIGN PATENT DOCUMENTS

JP 2011-96392 A 6/2011
JP 2012-48946 A 3/2012

(Continued)

OTHER PUBLICATIONS

Office Action dated Oct. 21, 2025 in corresponding Japan Patent Application JP2022-071296, with Machine Translation.

*Primary Examiner* — Tulsidas C Patel
*Assistant Examiner* — Carlos E Lopez-Pagan
(74) *Attorney, Agent, or Firm* — Renner, Otto, Boisselle & Sklar, LLP

(57) ABSTRACT

A connection structure includes a first terminal including a first contact part, the first contact part including a plurality of first projections arranged at a first array pitch in a first direction and arranged at a second array pitch in a second direction, and a second terminal including a second contact part, the second contact part being brought into contact with the first contact part while being opposed to the first contact part, the second contact part including a plurality of second projections arranged at a third array pitch in the first direction and arranged at a fourth array pitch in the second direction. One of the first array pitch and the third array pitch is equal to a first integral multiple of another, and one of the second array pitch and the fourth array pitch is equal to a second integral multiple of another.

14 Claims, 16 Drawing Sheets

(56) References Cited

U.S. PATENT DOCUMENTS

| | | | | |
|---|---|---|---|---|
| 2012/0052747 | A1 | 3/2012 | Kataoka et al. | |
| 2012/0196468 | A1 | 8/2012 | Nakatsuji et al. | |
| 2015/0056875 | A1 | 2/2015 | Kobayashi et al. | |
| 2016/0087353 | A1* | 3/2016 | Endo | H01R 4/48 439/816 |
| 2017/0033486 | A1* | 2/2017 | Saka | H01R 13/03 |
| 2019/0288438 | A1* | 9/2019 | Reedy | H01R 13/04 |

FOREIGN PATENT DOCUMENTS

| | | | |
|---|---|---|---|
| JP | 2012-156116 | A | 8/2012 |
| JP | 5831611 | B1 | 12/2015 |
| WO | 2013/137415 | A1 | 9/2013 |

* cited by examiner

CONNECTION STRUCTURE WITH IMPROVED CONTACT RELIABILITY

INCORPORATION BY REFERENCE

This application is based upon and claims the benefit of priority from Japanese patent application No. 2022-071296, filed on Apr. 25, 2022, the disclosure of which is incorporated herein in its entirety by reference.

BACKGROUND

The present disclosure relates to a connection structure.

Japanese Patent No. 5831611 describes, for example, projections 111 formed on a male terminal 110 and an expanded part 121 formed on a female terminal 120 as shown in FIG. 16. The projections 111 of the male terminal 110 are extended in a direction in which the male terminal 110 is inserted. The connection structure of Patent Literature 1 has projections at contact parts of both the male terminal 110 and the female terminal 120, the male terminal 110 and the female terminal 120 being brought into contact with each other.

SUMMARY

However, in the connection structure of Patent Literature 1, the contact parts are easily moved due to unintended loads such as vibration and shock applied to the contact parts. Thus, the contact parts of Patent Literature 1 easily wear out. In addition, there is a concern that a portion of each of the contact parts may be scraped and thus a contact force may be weakened. There is another concern that the contact parts of Patent Literature 1 may result in one-point contact, making it difficult to improve contact reliability.

An object of the present disclosure is to provide a connection structure that can improve contact reliability.

According to an example aspect of the present disclosure, a connection structure includes: a first terminal including a first contact part, the first contact part including a plurality of first projections or first recesses arranged at a first array pitch in a first direction and arranged at a second array pitch in a second direction, the second direction intersecting the first direction; and a second terminal including a second contact part, the second contact part being brought into contact with the first contact part while being opposed to the first contact part, the second contact part including a plurality of second projections or second recesses arranged at a third array pitch in the first direction and arranged at a fourth array pitch in the second direction when the second contact part is opposed to the first contact part. One of the first array pitch and the third array pitch may be equal to a first integral multiple of another, and one of the second array pitch and the fourth array pitch may be equal to a second integral multiple of another.

In the above connection structure, the first contact part may include the plurality of first projections, the second contact part may include the plurality of second projections, the first integral multiple and the second integral multiple may be 1, and each of the first projections may be positioned between one of the second projections and another one of the second projections, so that the first contact part is brought into contact with the second contact part.

In the above connection structure, the first direction and the second direction may be orthogonal to each other, and each of the first projections and the second projections may be quadrangular pyramidal.

In the above connection structure, the first contact part may include the plurality of first projections, the second contact part may include the plurality of second recesses, the first integral multiple and the second integral multiple may be 1, and each of the first projections may be fitted into a corresponding one of the second recesses, so that the first contact part is brought into contact with the second contact part.

In the above connection structure, the first direction and the second direction may be orthogonal to each other, and the first projection may be quadrangular pyramidal.

In the above connection structure, the first contact part may include the plurality of first recesses, the second contact part may include the plurality of second projections, the first integral multiple and the second integral multiple may be 1, and each of the first recesses may be fitted to a corresponding one of the second projections, so that the first contact part is brought into contact with the second contact part.

In the above connection structure, the first direction and the second direction may be orthogonal to each other, and the second projection may be quadrangular pyramidal.

The above connection structure may further include a moving space configured to allow the first contact part to be moved to a position opposed to second contact part without any insertion force being applied; and holding means for moving the first contact part in a direction viewed from the first contact part toward the second contact part in a third direction, the third direction being orthogonal to the first direction and the second direction, and holding contact between the first contact part and the second contact part.

In the above connection structure, combined thicknesses of the first terminal and the second terminal in the third direction while the holding means holds the contact between the first contact part and the second contact part may be smaller than a sum of the thickness of the first terminal in the third direction and a thickness of the second terminal in the third direction.

In the above connection structure, the moving space may be extended in the first direction, and the first direction and the second direction may be orthogonal to each other.

The above connection structure may further include pressing means for pressing the first contact part against the second contact part in the direction viewed from the first contact part toward the second contact part in the third direction when the first contact part is moved to the position opposed to second contact part, the third direction being orthogonal to the first direction and the second direction.

The above connection structure may be a connector capable of connecting and disconnecting the first terminal and the second terminal.

According to the present disclosure, it is possible to provide a connection structure that can improve contact reliability.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A specific configuration of this embodiment will be described below with reference to the drawings. The following descriptions show the preferred embodiments of the present disclosure and do not limit the scope of the disclosure to the following embodiment. In the following descriptions, those with the same signs indicate substantially the same content.

First Embodiment

Figure 1:
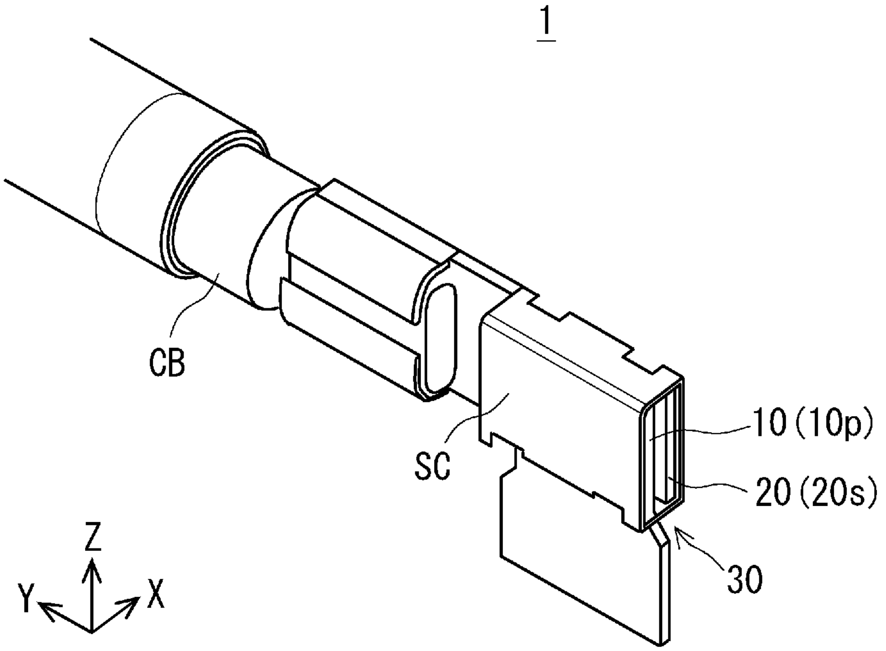
FIG. 1 is a perspective view showing an example of a connection structure according to a first embodiment.

A connection structure according to a first embodiment will be described. FIG. 1 is a perspective view showing an example of the connection structure according to the first embodiment. As shown in FIG. 1, the connection structure 1 includes a first terminal 10 and a second terminal 20. The connection structure 1 is a connector for in-vehicle applications including, for example, a cable CB that allows a large current to flow. The connection structure 1 controls the flow of the current by connecting and disconnecting the first terminal 10 and the second terminal 20. Note that the connection structure 1 is not limited to a connector for in-vehicle applications including the cable CB that allows a large current to flow, and instead may be a connector for a cable CB that allows a low current to flow. In addition, the connection structure 1 is not limited to a connector capable of connecting and disconnecting the first terminal 10 and the second terminal 20. Alternatively, the connection structure 1 may be the one in which the first terminal 10 and the second terminal 20 are fixed by screwing or the like to maintain a connection state in such a way that disconnection of the first terminal 10 from the second terminal 20 is not intended.

The first terminal 10 is, for example, a pin contact 10*p*. Note that the first terminal 10 is not limited to the pin contact 10*p* as long as it can be in contact with the second terminal 20 and allows a current to flow. The second terminal 20 is, for example, a socket contact 20*s*. Note that the second terminal 20 is not limited to the socket contact 20*s* as long as it can be in contact with the first terminal 10 and allows a current to flow. The socket contact 20*s* may be covered by a socket SC. The socket SC has an insertion port 30 through which the pin contact 10*p* can be inserted to a position opposed to the socket contact 20*s*. The pin contact 10*p* is connected to the socket contact 20*s* by being inserted into the socket SC through the insertion port 30.

Here, for the convenience of explaining the connection structure 1, an XYZ orthogonal coordinate system is introduced. A direction in which the first terminal 10 and the second terminal 20 are opposed to each other is defined as an X axis direction when the first terminal 10 and the second terminal 20 are brought into contact while being opposed to each other. A direction from the first terminal 10 toward the second terminal 20 is defined as a +X axis direction. One of the two directions orthogonal to the X axis direction is defined as a Z axis direction. For example, a direction in which the first terminal 10 as the pin contact 10*p* is moved within the socket SC is defined as the Z axis direction. A direction in which the pin contact 10*p* is inserted into the socket SC is defined as a +Z axis direction. The direction orthogonal to the X axis direction and the Z axis direction is defined as a Y axis direction.

Figure 2:
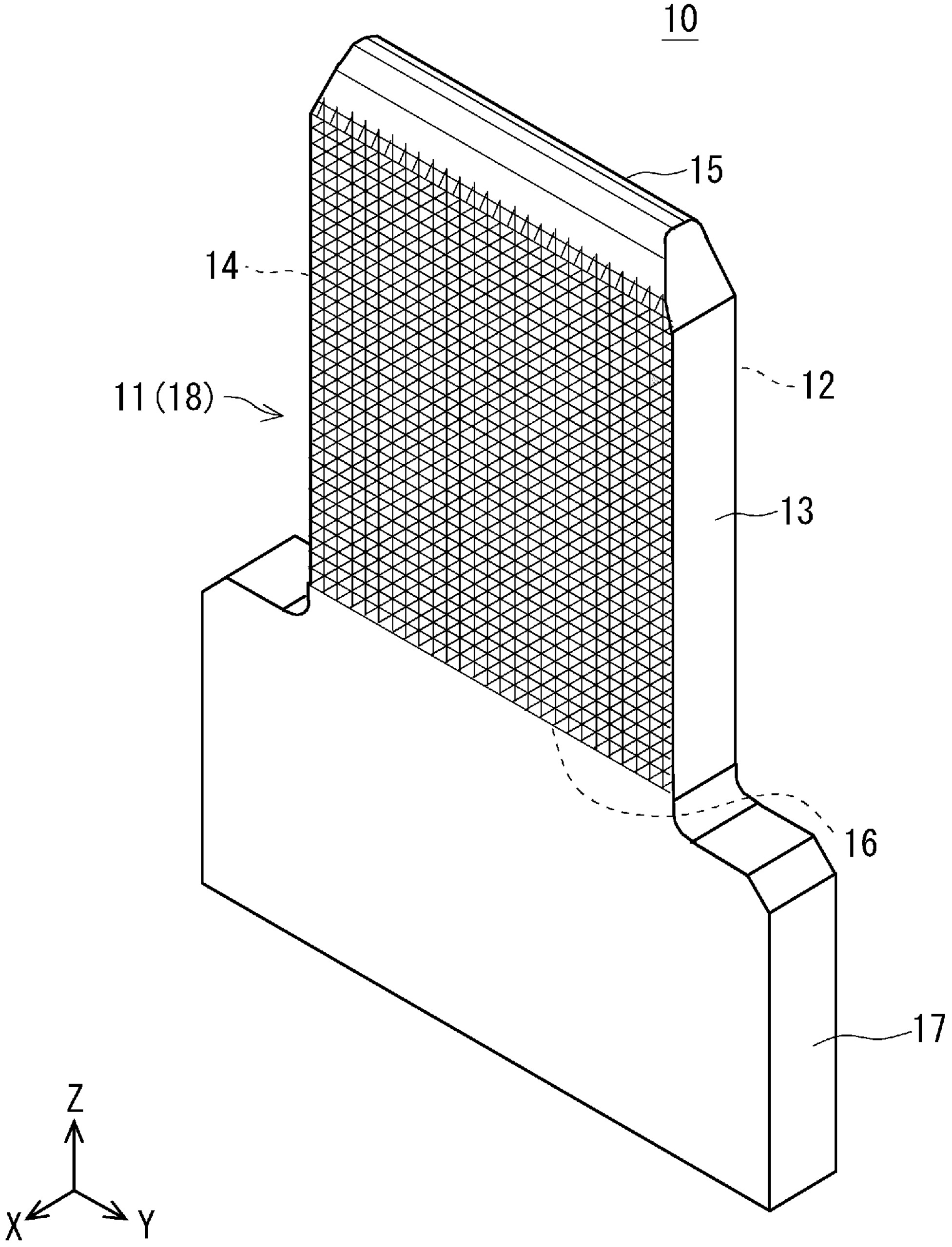
FIG. 2 is a perspective view showing an example of a first terminal according to the first embodiment.

FIG. 2 is a perspective view showing an example of the first terminal 10 according to the first embodiment. The first terminal 10 is, for example, a rectangular plate-shaped member and has two plate surfaces 11 and 12, two side surfaces 13 and 14, and two end surfaces 15 and 16. The end surface 16 is, for example, connected to a base 17 and the cable CB or the like with the base 17 interposed therebetween. The plate surface 11 is a first contact part 18 to be brought into contact with the second terminal 20. This means that the first terminal 10 has the first contact part 18. The shape of the first terminal 10 may be, for example, hemispherical with the first contact part 18 as a cross section as long as the first terminal 10 has the first contact part 18 to be brought into contact with the second terminal 20.

Figure 3:
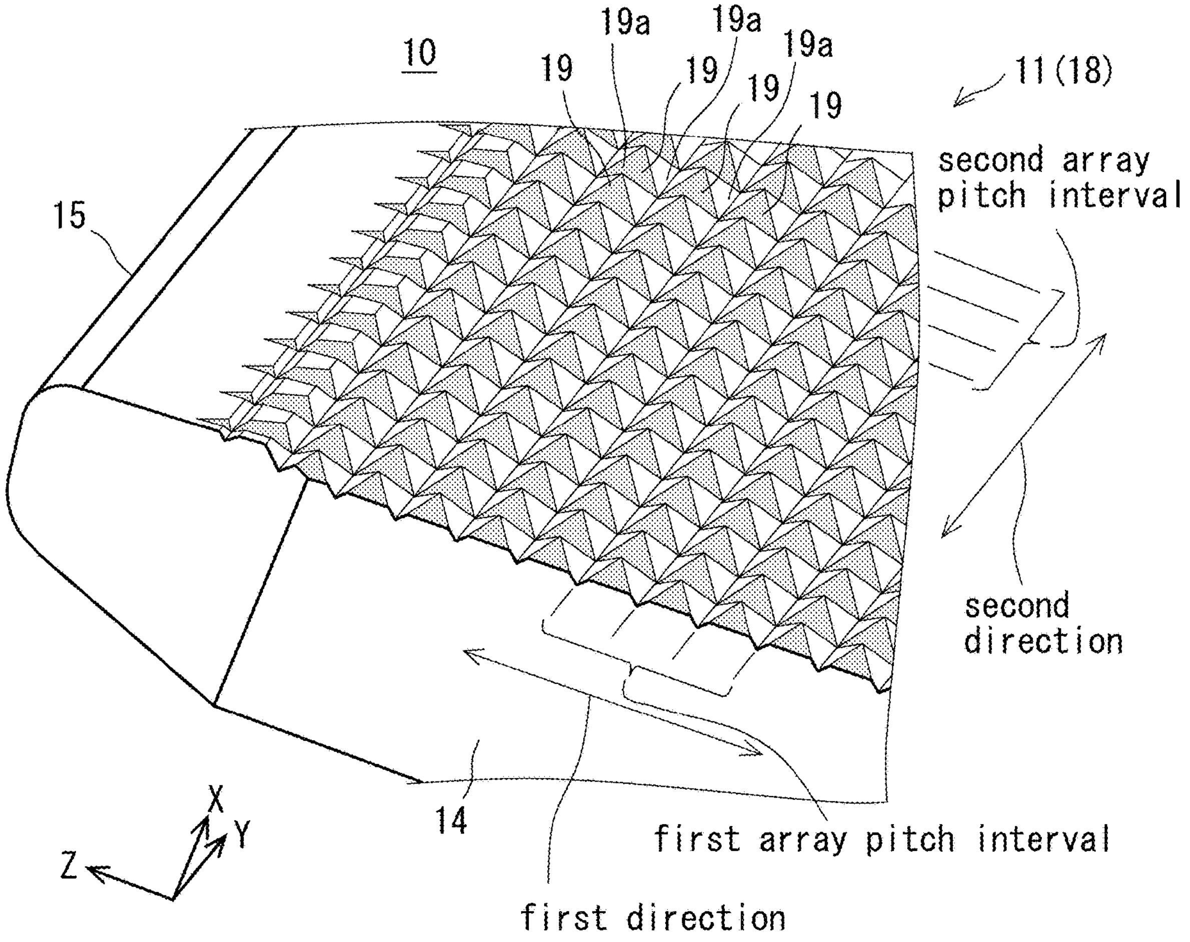
FIG. 3 is a perspective view showing an example of a first contact part of the first terminal according to the first embodiment.

FIG. 3 is a perspective view showing an example of the first contact part 18 of the first terminal 10 according to the first embodiment. As shown in FIG. 3, the first contact part 18 includes a plurality of first projections 19. In FIG. 3, some symbols are omitted so as not to complicate the drawing. Also in the drawing from FIG. 3 onwards, some symbols may be omitted so as not to complicate the drawings.

The first contact part 18 can also be said to be a contact surface, considering the surfaces of the plurality of first projections 19 on the plate surface 11. The plurality of first projections 19 are arranged at a predetermined first array pitch in a first direction. The first direction is, for example, the Z axis direction. The plurality of first projections 19 are arranged at a predetermined second array pitch in a second direction. The second direction is, for example, the Y axis direction. In this embodiment, the first and second directions are orthogonal to each other.

The first and second directions in which the plurality of first projections 19 are arranged are not limited to the Z axis direction and Y axis direction, respectively. For example, the first and second directions may be inclined toward the Z axis and Y axis directions in an YZ plane, respectively. In addition, the first and second directions are not limited to directions orthogonal to each other as long as they are directions intersecting each other.

Each of the first projections 19 is, for example, quadrangular pyramidal. A bottom surface of the quadrangular pyramidal first projection 19 is a square with two sides extending in the Y axis direction and two sides extending in the Z axis direction. The plurality of first projections 19 are formed, for example, by forming a plurality of grooves each having a V-shaped cross section extending in the Z axis direction on the plate surface 11 and then forming a plurality of grooves each having a V-shaped cross section extending in the Y axis direction on the plate surface 11. The method of forming the plurality of first projections 19 is not limited to the formation of grooves having the V-shaped cross sections, and instead may be formed by casting, forging, 3D printer, etc.

The shape of each of the first projections 19 is not limited to a quadrangular pyramid, and may instead be conical or semicircular. Alternatively, for example, the shape of each of the first projections 19 may be a triangular pyramid with angles in the first and second directions of 60 degrees.

The first array pitch at which the plurality of first projections 19 are arranged in the first direction is an interval between the adjacent first projections 19 in the first direction. The first array pitch in the first direction, in which the plurality of first projections 19 are arranged, is, for example, a length of one side of a bottom surface of the quadrangular pyramid. The second array pitch, in which the plurality of first projections 19 are arranged in the second direction, is an interval between adjacent first projections 19 in the second direction. The second array pitch in the second direction, in which the plurality of the first projections 19 are arranged, is, for example, the length of one side of the bottom surface of the quadrangular pyramid in a manner similar to the first array pitch.

Figure 4:
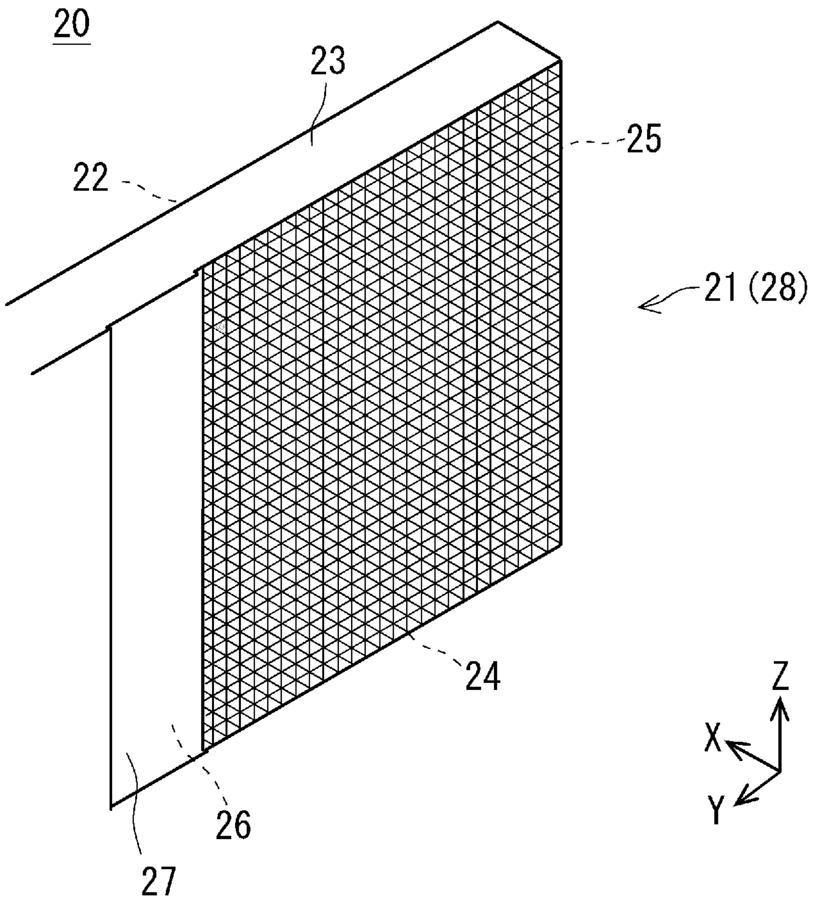
FIG. 4 is a perspective view showing an example of a second terminal according to the first embodiment.

FIG. 4 is a perspective view showing an example of the second terminal 20 according to the first embodiment. The second terminal 20 is, for example, a rectangular plate-shaped member and has two plate surfaces 21 and 22, two side surfaces 23 and 24, and two end surfaces 25 and 26. The end surface 26 is, for example, connected to a base 27 and connected to the cable CB or the like with the base 27 interposed therebetween. The plate surface 21 is a second contact part 28 to be brought into contact with the first terminal 10. Thus, the second terminal 20 has the second contact part 28 that is opposed to the first contact part 18. The shape of the second terminal 20 is not limited to a plate shape as long as it has the second contact part 28 to be in contact with the first second terminal 10. The shape of the second terminal 10 may be, for example, hemispherical with the second contact part 28 as a cross section.

Figure 5:
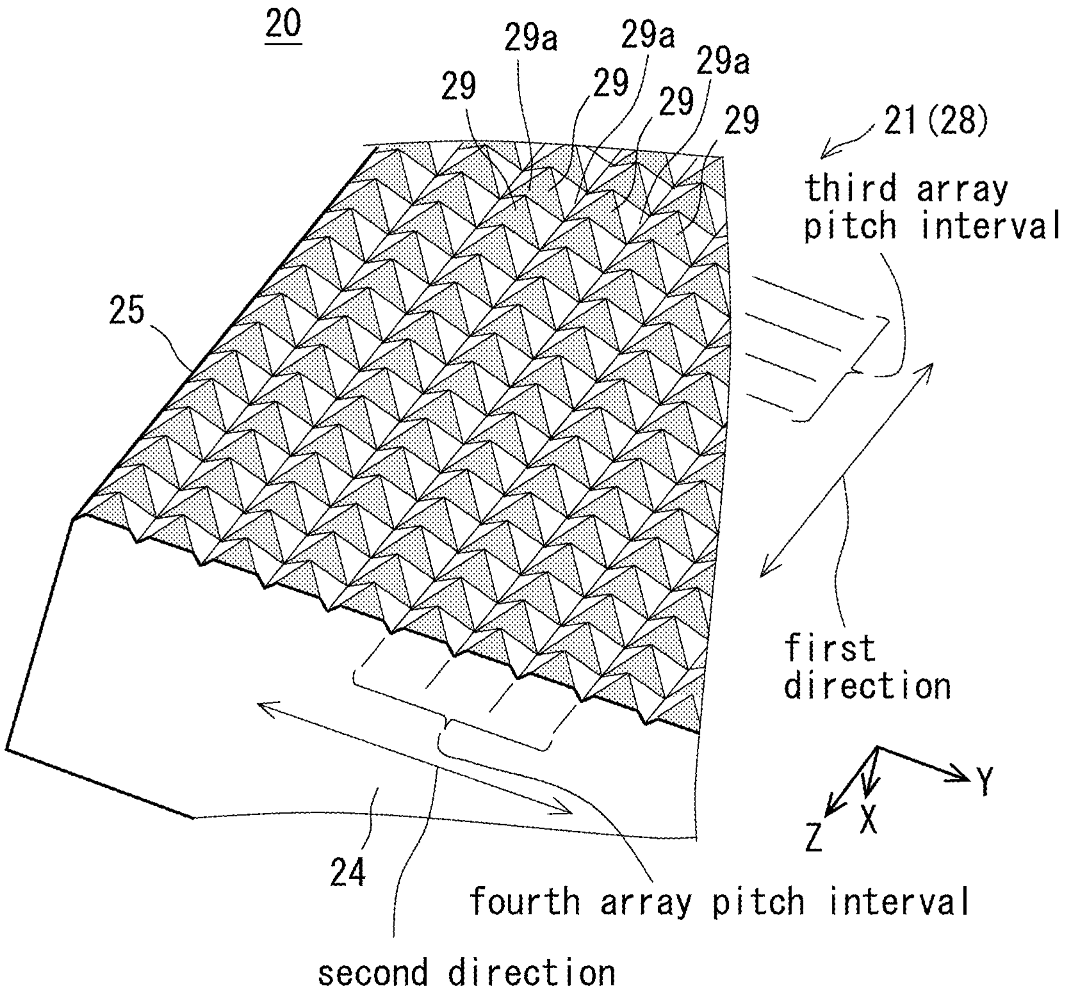
FIG. 5 is a perspective view showing an example of a second contact part of the second terminal according to the first embodiment.

FIG. 5 is a perspective view showing an example of the second contact part 28 of the second terminal 20 according to the first embodiment. As shown in FIG. 3, the second contact part 28 includes a plurality of second projections 29. The second contact part 28 can also be said to be a contact surface, considering the surfaces of the plurality of second projections 29 on the plate surface 21. When the second contact part 28 is opposed to the first contact part 18, the plurality of second projections 29 are arranged at a predetermined third array pitch in the first direction. The first direction is, for example, the Z axis direction. The plurality of second projections 29 are arranged at a predetermined fourth array pitch in the second direction. The second direction is, for example, the Y axis direction. In this embodiment, the first and second directions are orthogonal to each other.

In a manner similar to the first projections 19, the first and second directions in which the plurality of second projections 29 are arranged are not limited to the Z axis direction and Y axis direction, respectively. For example, the first and second directions may be inclined toward the Z axis and Y axis directions in the YZ plane, respectively. In addition, the first and second directions are not limited to directions orthogonal to each other as long as they are directions intersecting each other.

Each of the second projections 29 is, for example, quadrangular pyramidal. A bottom surface of the quadrangular pyramidal second projection 29 is a square with two sides extending in the Y axis direction and two sides extending in the Z axis direction. The method of forming the plurality of second projections 29 may be the same as the method of forming the plurality of first projections 19, or a different method may be used.

The shape of each of the second projections 29 is not limited to a quadrangular pyramid, and may instead be conical or semicircular. Alternatively, for example, the shape of each of the second projection 29 may be a triangular pyramid with angles in the first and second directions of 60 degrees.

The third array pitch, in which the plurality of second projections 29 are arranged in the first direction, is an interval between adjacent second projections 29 in the first direction. The third array pitch in the first direction, in which the plurality of second projections 29 are arranged, is, for example, a length of one side of the bottom surface of the quadrangular pyramid. The fourth array pitch, in which the plurality of second projections 29 are arranged in the second direction, is an interval between adjacent second projections 29 in the second direction. The fourth array pitch in the second direction, in which the plurality of the second projections 29 are arranged, is, for example, the length of one side of the bottom surface of the quadrangular pyramid in a manner similar to the third array pitch.

One of the first array pitch and the third array pitch is equal to a first integral multiple of the other. For example, the first integral multiple is one. That is, the plurality of first projections 19 arranged in the first direction are arranged at the same array pitch as that of the plurality of second projections 29 arranged in the first direction. One of the second array pitch and the fourth array pitch is equal to a second integral multiple of the other. For example, the second integral multiple is one. That is, the plurality of first projections 19 arranged in the second direction are arranged at the same array pitch as that of the plurality of second projections 29 arranged in the second direction.

The larger the array pitch, the larger the interval between the adjacent first projections 19 and the intervals between the adjacent second projections 29 become. For example, when the first array pitch at which the first projections 19 are arranged is a pitch twice as large as the third array pitch at which the second projections 29 are arranged, this means that the size of the intervals between the adjacent first projections 19 is twice the size of the intervals between the adjacent second projections 29.

Figure 6:
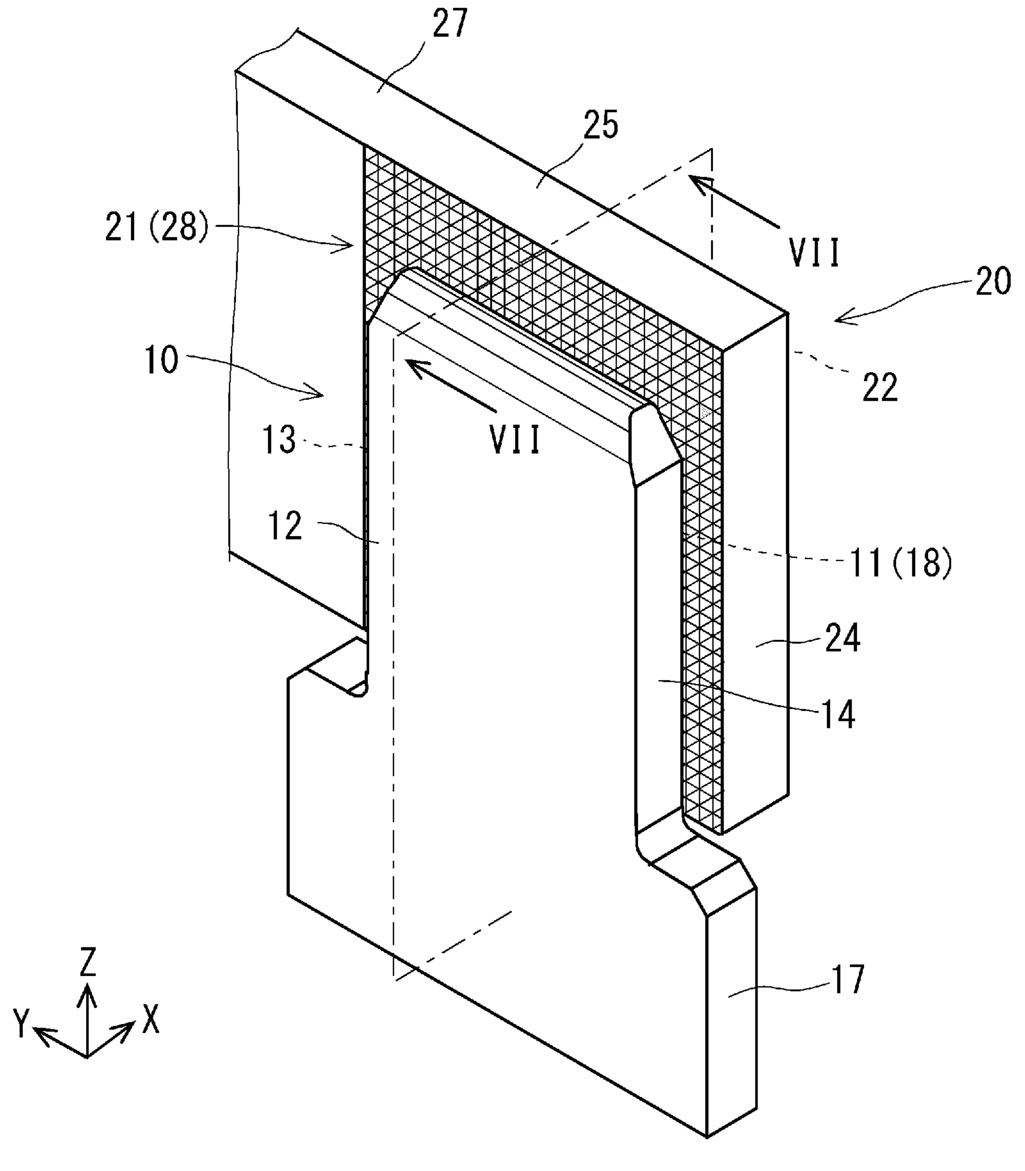
FIG. 6 is a perspective view showing an example of the first and second terminals in the connection structure according to the first embodiment.
Figure 7:
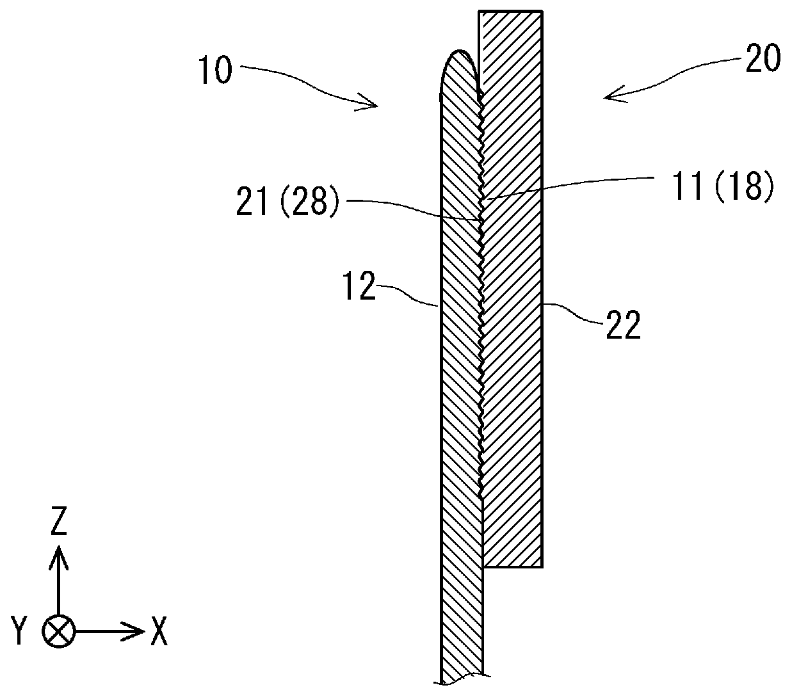
FIG. 7 is a cross-sectional view showing the first and second terminals in the connection structure according to the first embodiment, and shows a cross section taken along the line VII-VII of FIG. 6.

FIG. 6 is a perspective view showing an example of the first terminal 10 and the second terminal 20 in the connection structure 1 according to the first embodiment. FIG. 7 is a cross-sectional view showing the first terminal 10 and the second terminal 20 in the connection structure 1 according to the first embodiment, and shows a cross section taken along the line VII-VII of FIG. 6. As shown in FIG. 6 and FIG. 7, in the connection structure 1, each of the first projections 19 in the first contact part 18 of the first terminal 10 is positioned between one of the second projections 29 and another one of the second projections 29, so that the first contact part 18 is brought into contact with the second contact part 28. In other words, each second projection 29 is positioned between one of the first projections 19 and another one of the first projections 19, thereby bringing the second contact part 28 into contact with the first contact part 18.

Specifically, for example, as shown in FIG. 5, each recess **29*a* is formed between one of the second projections 29 and another one of the second projections 29. For example, the recesses 29*a* are formed between the second projections 29 arranged in the first direction (e.g., in the Z axis direction) and their adjacent second projections 29. Each recess 29*a* is arranged in the first direction. Each of the first projections 19 arranged in the first direction of the first terminal 10 is fitted into the corresponding one of the recesses 29*a* arranged in the first direction of the second terminal 20**.

As shown in FIG. 3, each recess **19*a* is formed between one of the first projections 19 and another one of the first projections 19. For example, the recesses 19*a* are formed between the first projections 19 arranged in the first direction and their adjacent first projections 19. Each recess 19*a* is arranged in the first direction. Each of the second projections 29 arranged in the first direction of the second terminal 20 is fitted into a corresponding one of the recesses 19*a* arranged in the first direction of the first terminal 10**.

Similarly, in the second direction (e.g., in the Y axis direction), each of the first projections 19 arranged in the second direction of the first terminal 10 is fitted into a corresponding one of the recesses **29*a* arranged in the second direction of the second terminal 20. Each of the second projections 29 arranged in the second direction of the second terminal 20 is fitted into the corresponding one of the recesses 19*a* arranged in the second direction of the first terminal 10**.

The same can be said regarding the directions inclined by 45 degrees from the first and second directions in the planes including the first and second directions, when the first and second directions are orthogonal to each other. Specifically, the direction inclined by 45 degrees from the Y axis and Z axis in the YZ plane is referred to as a 45 degree direction. Then, each of the first projections 19 arranged in the 45 degree direction may be fitted into a corresponding one of the recesses **29*a* arranged in the 45 degree direction, and each of the second projections 29 arranged in the 45 degree direction may be fitted into a corresponding one of the first recesses 19*a*** arranged in the 45 degree direction.

Figure 8:
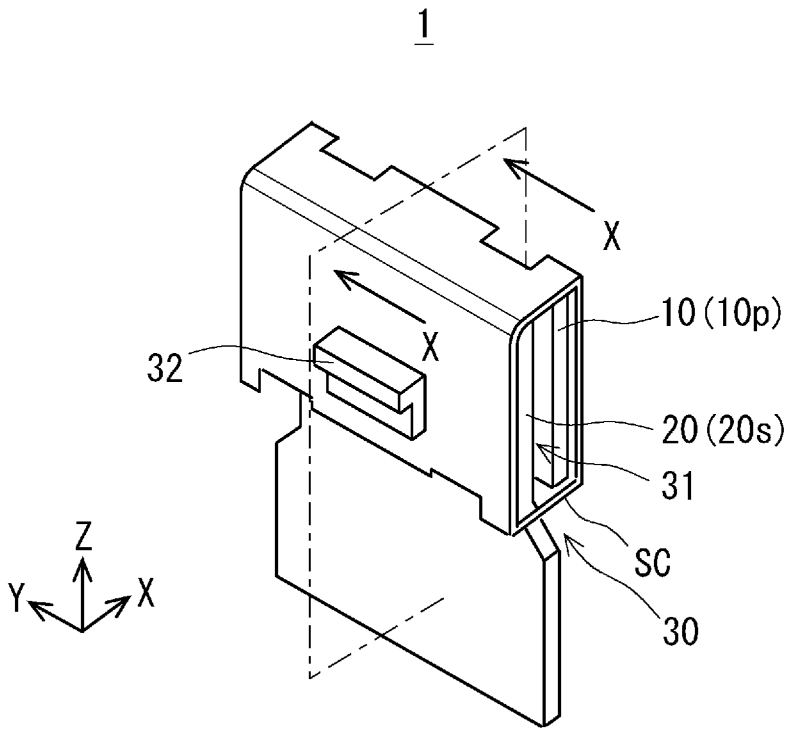
FIG. 8 is a perspective view showing an example of the first and second terminals in ZIF contact in the connection structure according to the first embodiment.
Figure 9:
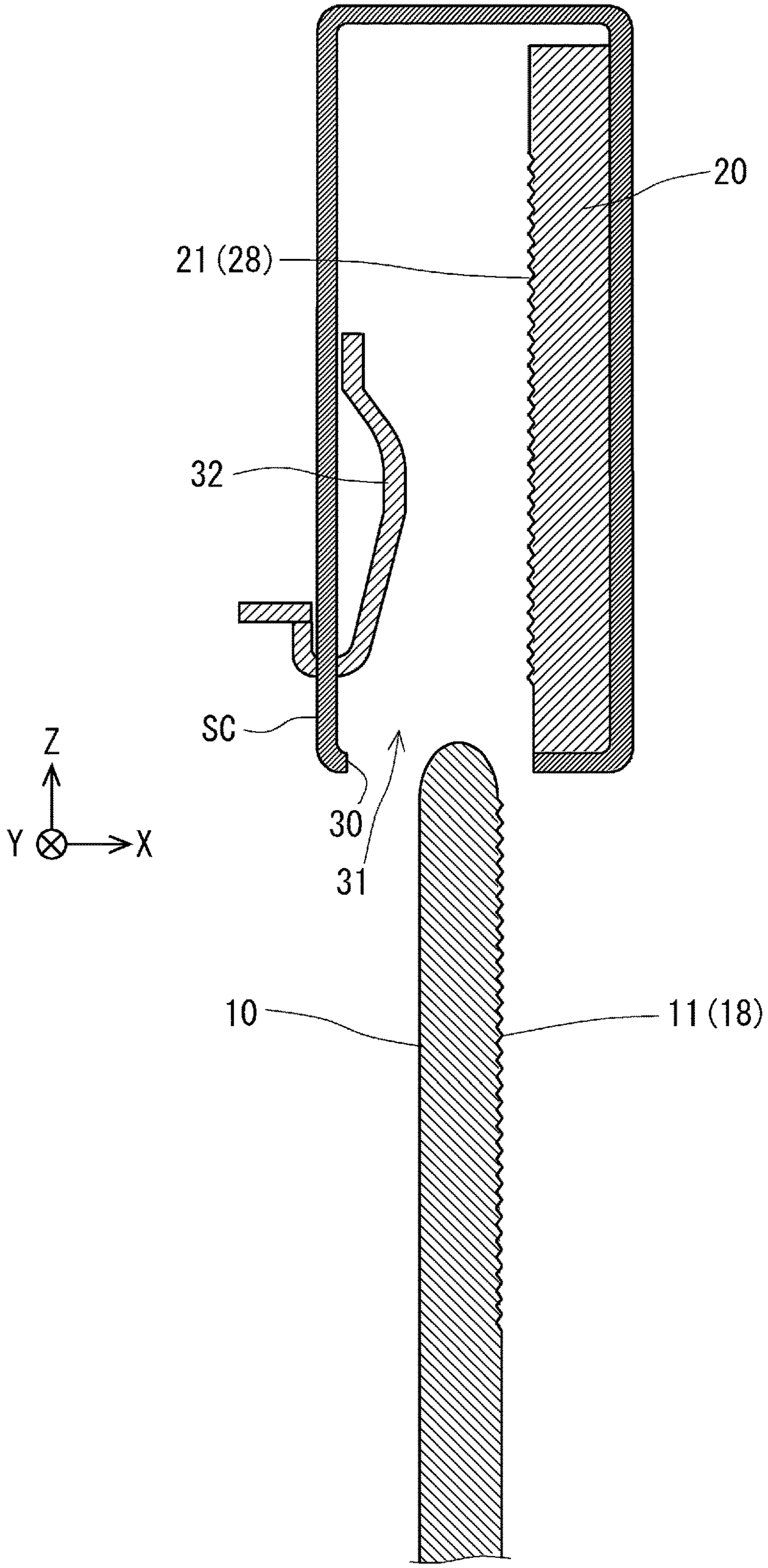
FIG. 9 is a cross-sectional view showing an example of an operation of the first and second terminals in ZIF contact in the connection structure according to the first embodiment.
Figure 10:
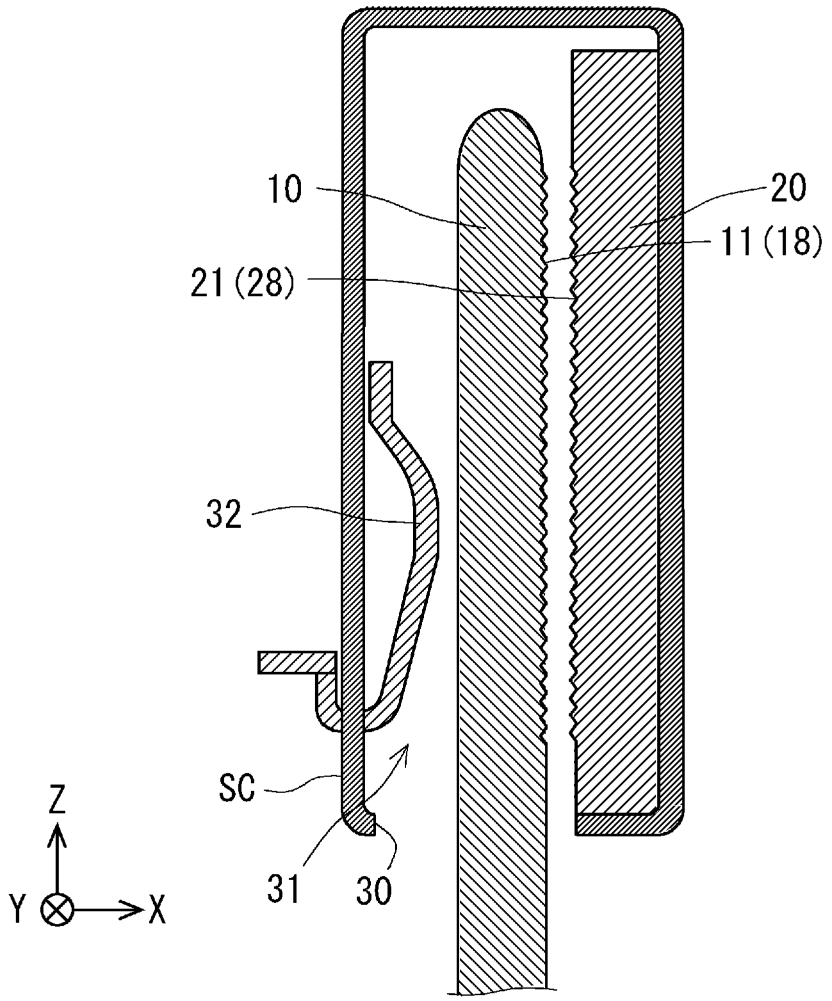
FIG. 10 is a cross-sectional view showing an example of the operation of the first and second terminals in ZIF contact in the connection structure according to the first embodiment, and shows a cross section taken along the line X-X of FIG. 8.
Figure 11:
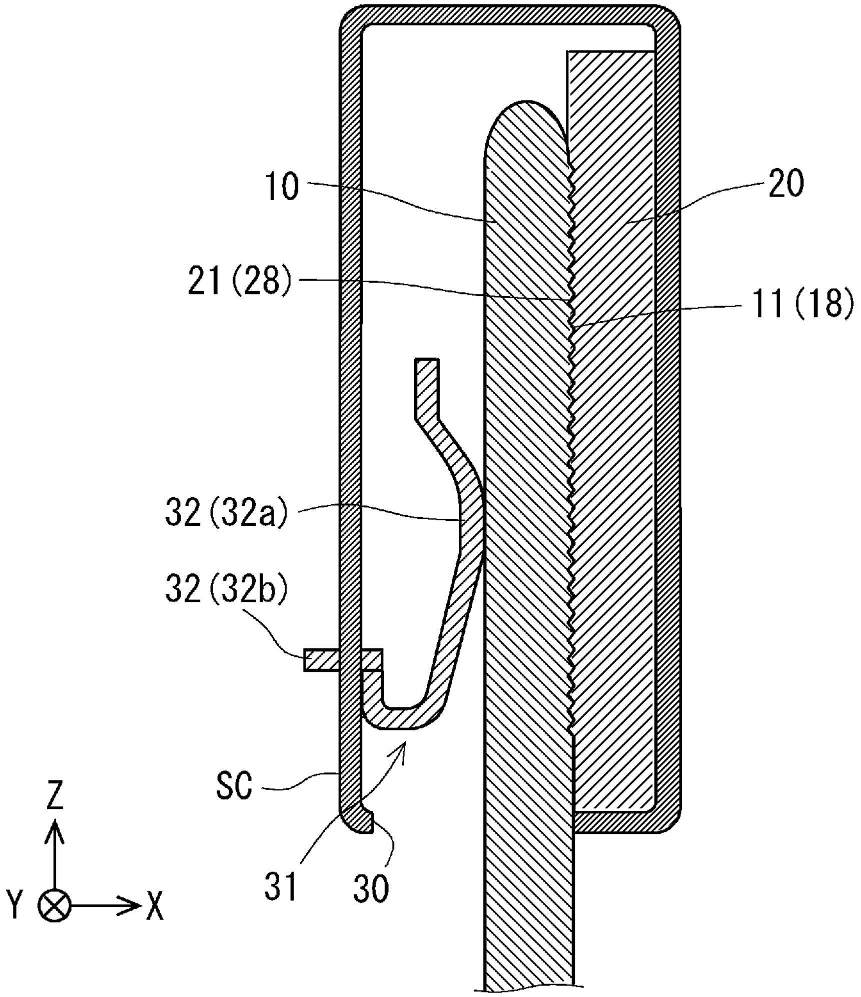
FIG. 11 is a cross-sectional view showing an example of the operation of the first and second terminals in ZIF contact in the connection structure according to the first embodiment.

Next, an operation when the connection structure 1 makes ZIF (Zero Insertion Force) contact will be described. FIG. 8 is a perspective view showing an example of the first terminal 10 and second terminal 20 in ZIF contact in the connection structure 1 according to the first embodiment. FIGS. 9 to 11 are cross-sectional views showing an example of the operation of the first terminal 10 and the second terminal 20 in ZIF contact in the connection structure 1 according to the first embodiment. FIG. 10 shows a cross section taken along the line X-X of FIG. 8.

As shown in FIGS. 8 to 11, the connection structure 1 may include a socket SC. The socket SC has an insertion port 30 for the first terminal 10 to be inserted, a moving space 31 where the first terminal 10 inserted from the insertion port 30 is moved, and holding means 32 for holding contact between the first contact part 18 of the first terminal 10 and the second contact part 28 of the second terminal.

As shown in FIG. 9, a length of the moving space 31 in the X axis direction between the holding means 32 and the second contact part 28 is larger than the length of the first terminal 10 in the X axis direction. Therefore, the first terminal 10 can be inserted into the socket SC without any insertion force. As shown in FIG. 10, the first contact part 18 of the first terminal 10 inserted into the socket SC is moved to a position opposed to second contact part 28. As described above, the connection structure 1 may have the moving space 31 to move the first contact part 18 to the position opposed to second contact part 28 without any insertion force being applied.

As shown in FIG. 11, the holding means 32 moves the first contact part 18 moved to the position opposed to second contact part 28 in the +X axis direction to hold the contact between the first contact part 18 and the second contact part 28. For example, the holding means 32 may include a leaf spring **32*a* and a lever 32*b*. The leaf spring 32*a* is moved in the −X axis direction by pulling the lever 32*b* out of the socket SC in the −X axis direction. After the first terminal 10 is inserted, the first contact part 18 is moved in the +X axis direction through the leaf spring 32*a* by moving the lever 32*b* in the +X axis direction. In this way, the contact between the first contact part 18 and the second contact part 28** is held.

The combined thicknesses of the first terminal 10 and the second terminal 20 in the X axis direction while the contact between the first contact part 18 and the second contact part 28 is held by the holding means 32 is smaller than the sum of the thickness of the first terminal 10 and the X axis thickness of the second terminal 20 in the X axis direction. That is, when the contact between the first contact part 18 and the second contact part 28 is held, the first projections 19 and the second projections 29 are engaged with each other. Therefore, the combined lengths of the first terminal 10 and the second terminal 20 in the X axis direction becomes smaller than the sum of the thickness of the first terminal 10 and the X axis thickness of the second terminal 20 in the X axis direction by an fitted length of the first projections 19 and the second projections 29. In this way, by making ZIF contact, the fitting state between the first projection 19 of the first contact part 18 and the second projection 29 of the second contact part 28 can be held, and thus the contact reliability can be improved.

In this embodiment, the first and second directions in which the first and second projections 19 and 29 are arranged are orthogonal to each other. The moving space 31 is extended in the first direction, and the direction in which the first terminal 10 is inserted is the first direction. In this case, when the first contact part 18 is moved in the first direction to the position opposed to second contact part 28, the rows of the first projections 19 arranged in the first direction can be passed so as to slide along between the rows of the second projections 29 arranged in the first direction. Thus, the first terminal 10 can be moved smoothly.

Figure 12:
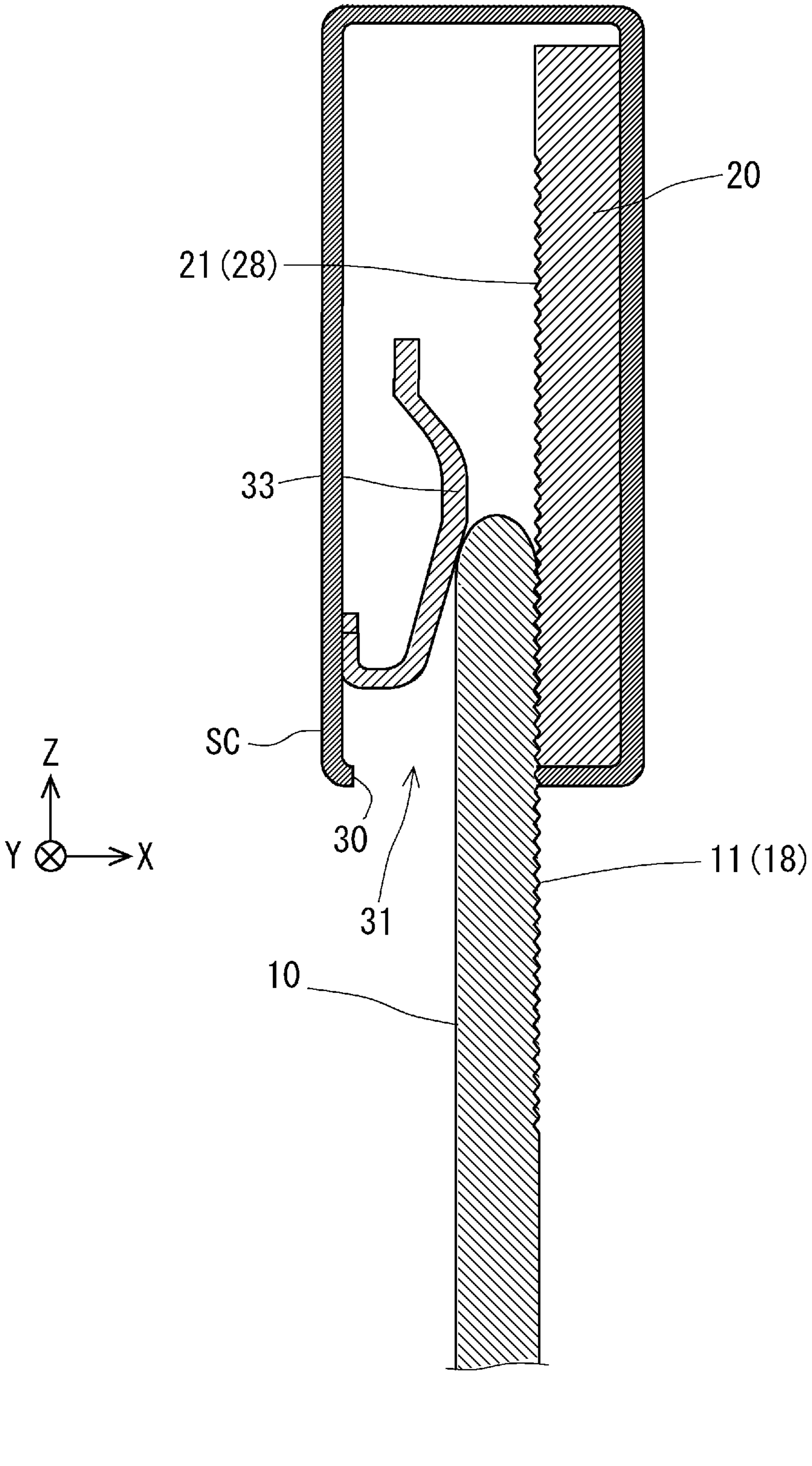
FIG. 12 is a cross-sectional view showing an example of the operation of the first and second terminals in another connection structure according to the first embodiment.
Figure 13:
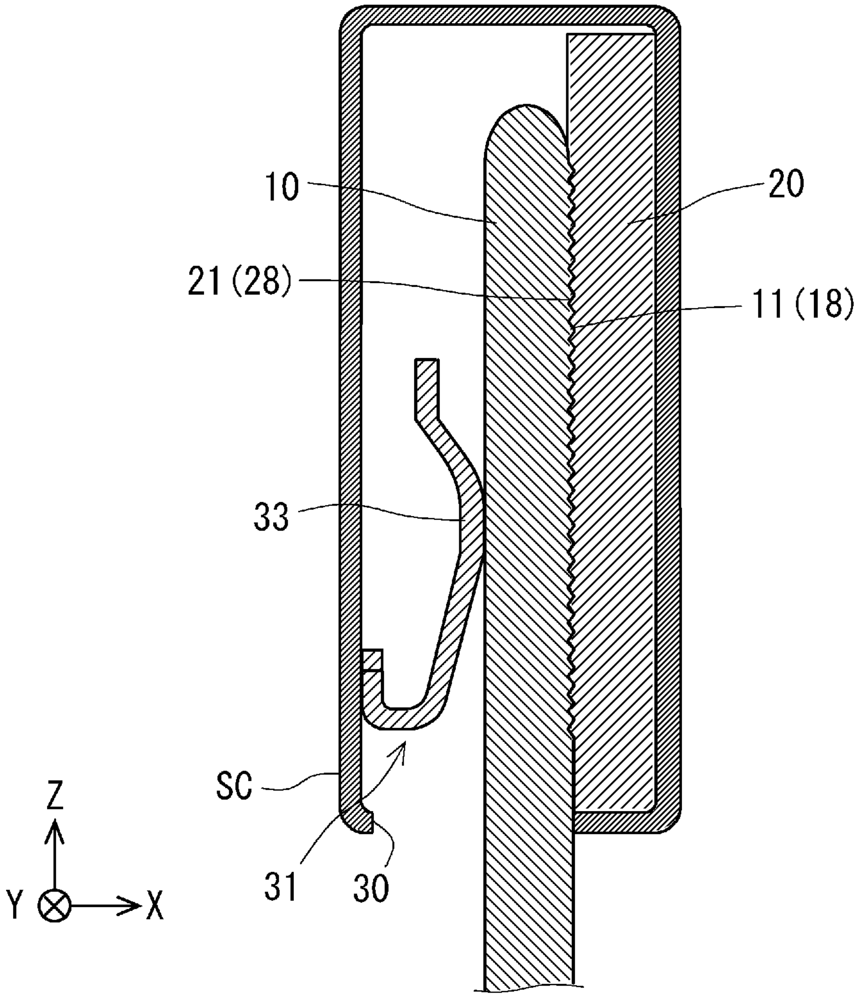
FIG. 13 is a cross-sectional view showing an example of the operation of the first and second terminals in another connection structure according to the first embodiment.

FIGS. 12 and 13 are cross-sectional views showing an example of an operation of the first terminal 10 and the second terminal 20 in another connection structure 1 according to the first embodiment. As shown in FIGS. 12 and 13, the other connection structure may have pressing means 33 instead of the holding means 32.

As shown in FIG. 12, a length of the moving space 31 in the X axis direction between the pressing means 33 and the second contact part 28 is smaller than the length of the first terminal 10 in the X axis direction. The pressing means 33 is, for example, an elastic member such as a leaf spring. Therefore, when the first contact part 18 is moved to a position opposed to second contact part 28, the first terminal 10 is moved while making contact with the pressing means 33 and the second contact part 28. At this time, the pressing means 33 presses the first contact part 18 against the second contact part 28 in the +X axis direction. Thus, an insertion force is required when the first terminal 10 is inserted into the socket SC.

As shown in FIG. 13, the pressing means 33 presses the first contact part 18, which has been moved to the position opposed to second contact part 28, in the +X axis direction. Thus, the pressing means 33 can hold the contact between the first contact part 18 and the second contact part 28.

Next, the effect of this embodiment will be described. The connection structure 1 according to this embodiment has a plurality of first projections 19 and second projections 29 of a predetermined array pitch such as metal file in the first contact part 18 and the second contact part 28 of both the first terminal 10 and the second terminal 20. When each first projection 19 is positioned between one of the second projections 29 and another one of the second projections 29, the first contact part 18 is brought into contact with the second contact part 28. Therefore, the connection structure 1 can improve a friction force by a friction lock at plurality of points, and even if a load is applied to the first terminal 10 due to vibration, impact, or the like, the movement of the first terminal 10 can be reduced and contact wear can be reduced.

Specifically, each of the first projections 19 can be disposed between one of the second projections 29 and another one of the second projections 29 by making the array pitch of the first projections 19 be an integral multiple of the array pitch of the second projection 29. In this way, the contact area can be increased, and thus the contact reliability can be improved. For example, by making the integral multiple 1, the contact area can be further increased, and thus the contact reliability can be improved.

As described above, the connection structure 1 according to this embodiment can improve the contact reliability, because multi-point contact can always be obtained stably. In addition, the surface area of the contact surface is large, and thus the connection structure 1 according to this embodiment is excellent in heat dissipation. By making the first and second directions orthogonal to each other and making the first projection 19 and the second projection 29 quadrangular pyramidal, the contact area can be further increased, and thus the contact reliability can be improved.

Second Embodiment

Next, the connection structure according to a second embodiment will be described. This embodiment is a variation of the array pitches of the first and second projections.

Figure 14:
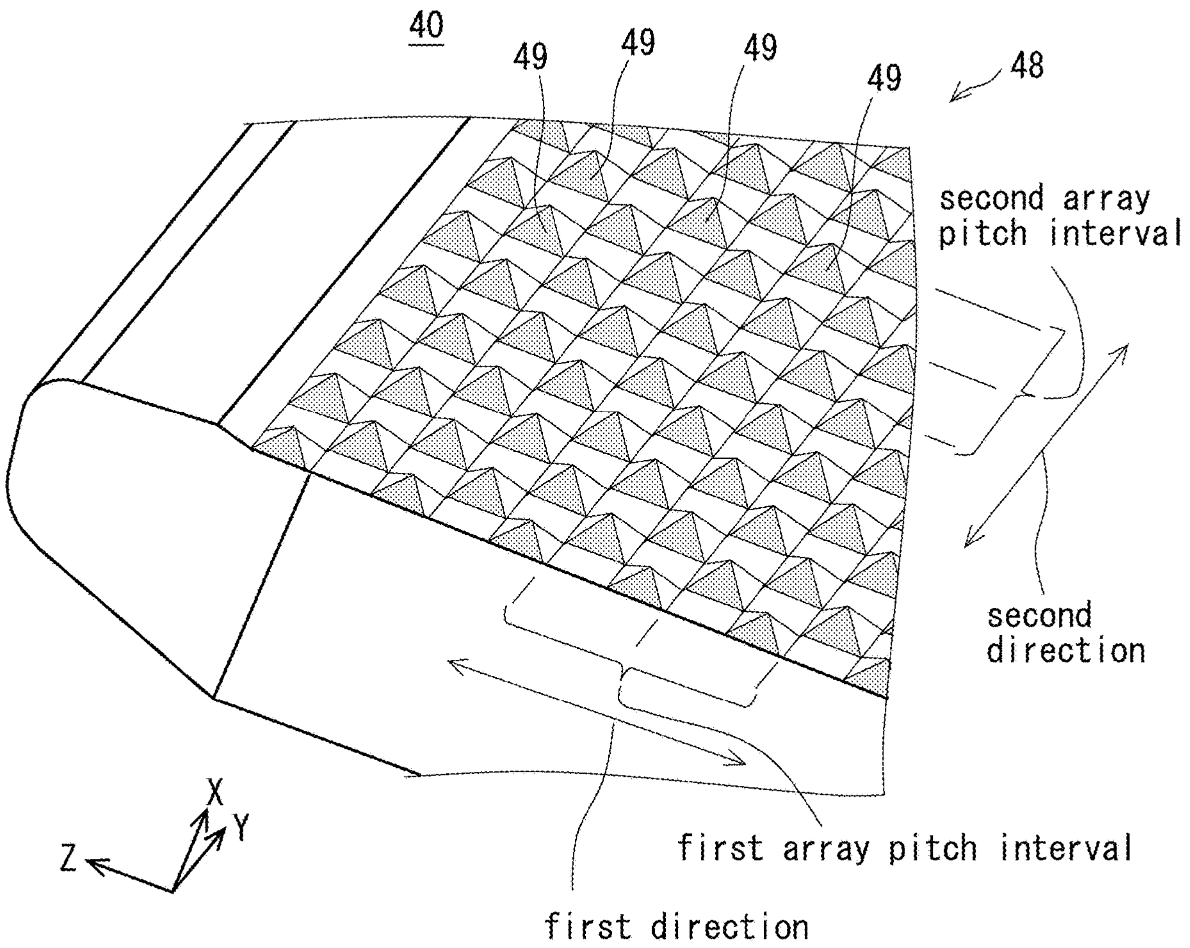
FIG. 14 is a perspective view showing an example of the first terminal in the connection structure according to the second embodiment.

FIG. 14 is a perspective view showing an example of a first terminal in the connection structure according to the second embodiment. As shown in FIG. 14, a first terminal 40 according to this embodiment has a first contact part 48 including a plurality of first projections 49 arranged at a first array pitch in the first direction and arranged at a second array pitch in the second direction. The first and second directions are the Z axis direction and the Y axis direction, respectively.

On the other hand, the second terminal 20, in a manner similar to the first embodiment, has the second contact part 28 including the plurality of second projections 29 arranged at a third array pitch in the first direction and arranged at a fourth array pitch in the second direction when opposed to the first contact part 48, as shown in FIG. 5.

Thus, one of the first array pitch and the third array pitch in the first direction is equal to twice the pitch of the other. Specifically, the first array pitch is twice the third array pitch. One of the second array pitch and the fourth array pitch in the second direction is arranged at twice the pitch of the other. Specifically, the second array pitch is twice the fourth array pitch. The first array pitch is not limited to twice the third array pitch, and may instead be three times or more, and the third array pitch may be two times or three times or more the first array pitch. The second array pitch is not limited to being twice the fourth array pitch and may instead be three times or more, and the fourth array pitch may be two times or three times or more than the second array pitch.

Thus, one of the first array pitch and the third array pitch in the first direction is not limited to being as large as a pitch of the other as long as it is an integral multiple of the other. In addition, one of the second array pitch and the fourth array pitch in the second direction is not limited to being as large as a pitch of the other as long as it is an integral multiple of the other. Note that the integral multiple of the other one of the array pitches in the first direction may be the same as the integral multiple of the other one of the array pitches in the second direction.

According to this embodiment, the flexibility of the array pitch can be improved. In addition, the contact reliability can be improved even in this embodiment, because the multi-point contact can be stably obtained. Descriptions of other configurations and effects are included in the descriptions of the first embodiment description.

Third Embodiment

Next, a connection structure according to a third embodiment is described. This embodiment is a variation of the projections and recesses of the first and second contact parts.

Figure 15:
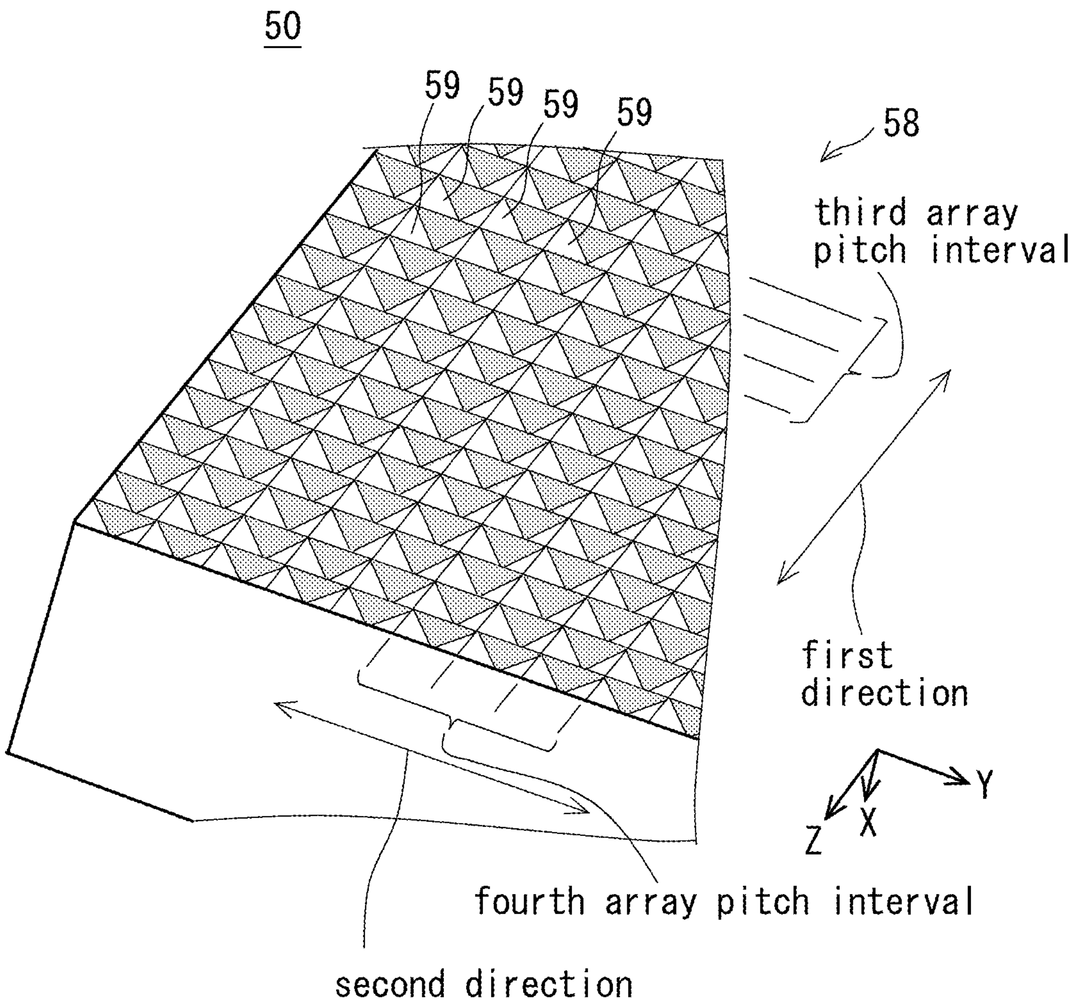
FIG. 15 is a perspective view showing an example of the second terminal in the connection structure according to the third embodiment.
Figure 16:
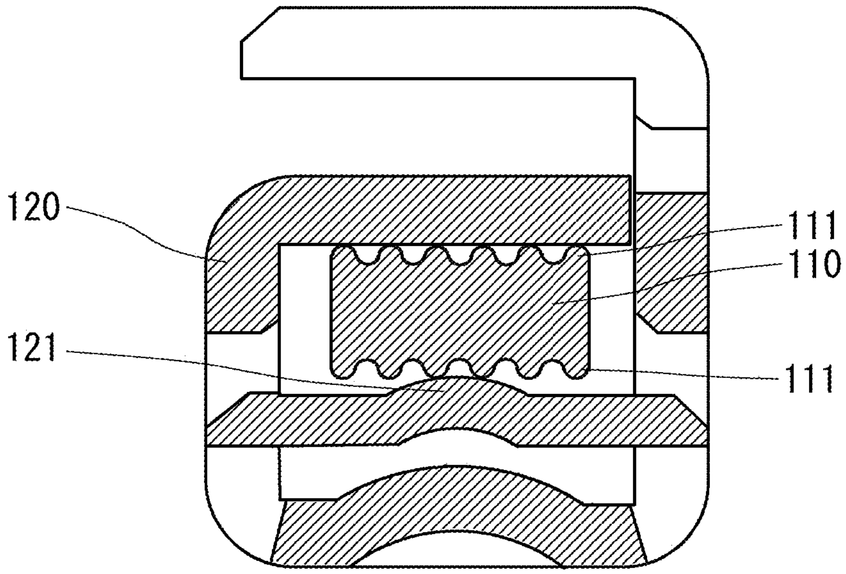
Fig. 16 PRIOR ART
FIG. 16 shows an example of a connection structure according to related art.

FIG. 15 is a perspective view showing an example of a second terminal in the connection structure according to the third embodiment. As shown in FIG. 15, a second terminal 50 has a second contact part 58 including a plurality of second recesses 59 arranged at a third array pitch in the first direction and arranged at a fourth array pitch in the second direction when the second terminal is opposed to the first contact part 18. Each of the second recesses 59 is a quadrangular pyramid-shaped recess into which the quadrangular pyramid-shaped first projection 19 is fitted.

As shown in FIG. 3, the first contact part 18 of the first terminal 10 includes the plurality of first projections 19. The second contact part 58 of the second terminal 50 includes the plurality of second recesses 59. In addition, one of the first array pitch and the third array pitch is as large as a pitch of the other, and one of the second array pitch and the fourth array pitch is as large as a pitch of the other. In this embodiment, each of the first projections 19 of the first terminal 10 is fitted into a corresponding one of the second recesses of the second terminal 50, so that the first contact part 18 is brought into contact with the second contact part 58.

While it is assumed that the first terminal 10 has the first contact part 18 including the plurality of first projections 19, and the second terminal 50 has the second contact part 58 including the plurality of second recesses 59, the configuration of the first terminal 10 and the configuration of the second terminal 20 may be reversed. That is, the second terminal 20 may have the second contact part 28 including the plurality of second projections 29, and the first terminal may have the first contact including the plurality of first recesses. In this case, the first contact part is brought into contact with the second contact part 28 by fitting each first recess to a corresponding one of the second projections 29.

It is also assumed that one of the first array pitch and the third array pitch is equal to as large as a pitch of the other, and that one of the second array pitch and the fourth array pitch is as large as a pitch of the other, but the present disclosure is not limited to this. If the first and second array pitches for the first projections 19 are larger than the third and fourth array pitches for the second recesses 59, the first and second integral multiples may be other than being as large as a pitch of the other. Also, if the first and second array pitches for the first recesses are smaller than the third and fourth array pitches for the second projections 29, the first and second integral multiples may be other than being as large as a pitch of the other.

In this embodiment, since the projections and recesses are fitted into each other, the contact area can be enlarged. Therefore, the contact reliability can be further improved. Descriptions of other configurations and effects are included in the descriptions in the first and second embodiments.

The embodiments of the present disclosure have been described above, but the disclosure includes appropriate modifications that do not impair its purpose and advantages, and is not limited by the above embodiments. For example, if the first terminal 10 has a first contact part including the plurality of first recesses, the second terminal 50 is not excluded from having the second contact part 58 including the plurality of second recesses 59. Even in such a case, the contact between the first contact part and the second contact part 58 can be held. In addition, each configuration in the first to third embodiment may be combined as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connection structure comprising:

a first terminal including a first contact part, the first contact part including a plurality of first projections or first recesses arranged at a first array pitch in a first direction and arranged at a second array pitch in a second direction, the second direction intersecting the first direction; and a second terminal including a second contact part, the second contact part being brought into contact with the first contact part while being opposed to the first contact part, the second contact part including a plurality of second projections or second recesses arranged at a third array pitch in the first direction and arranged at a fourth array pitch in the second direction when the second contact part is opposed to the first contact part, wherein one of the first array pitch and the third array pitch is equal to a first integral multiple of another, one of the second array pitch and the fourth array pitch is equal to a second integral multiple of another, and each of the first projections is positioned between one of the second projections and another one of the second projections, so that the first contact part is brought into contact with the second contact part.

2. The connection structure according to claim 1, further comprising an elastic member for pressing the first contact part against the second contact part in the direction viewed from the first contact part toward the second contact part in the third direction when the first contact part is moved to the position opposed to second contact part, the third direction being orthogonal to the first direction and the second direction.

3. The connection structure according to claim 1, wherein the connection structure may be a connector capable of connecting and disconnecting the first terminal and the second terminal.

4. The connection structure according to claim 1, wherein the first contact part includes the plurality of first projections, the second contact part includes the plurality of second projections, the first integral multiple and the second integral multiple are 1.

5. The connection structure according to claim 4, wherein the first direction and the second direction are orthogonal to each other, and each of the first projections and the second projections is quadrangular pyramidal.

6. The connection structure according to claim 1, wherein the first contact part includes the plurality of first projections, the second contact part includes the plurality of second recesses, the first integral multiple and the second integral multiple are 1, and each of the first projections is fitted into a corresponding one of the second recesses, so that the first contact part is brought into contact with the second contact part.

7. The connection structure according to claim 6, wherein the first direction and the second direction are orthogonal to each other, and the first projection is quadrangular pyramidal.

8. The connection structure according to claim 1, wherein the first contact part includes the plurality of first recesses, the second contact part includes the plurality of second projections, the first integral multiple and the second integral multiple are 1, and each of the first recesses is fitted to a corresponding one of the second projections, so that the first contact part is brought into contact with the second contact part.

9. The connection structure according to claim 8, wherein the first direction and the second direction are orthogonal to each other, and the second projection is quadrangular pyramidal.

10. The connection structure according to claim 1, further comprising:

a moving space configured to allow the first contact part to be moved to a position opposed to second contact part without any insertion force being applied; and a leaf spring device for moving the first contact part in a direction viewed from the first contact part toward the second contact part in a third direction, the third direction being orthogonal to the first direction and the second direction, and holding contact between the first contact part and the second contact part.

11. The connection structure according to claim 10, wherein combined thicknesses of the first terminal and the second terminal in the third direction while the leaf spring device holds the contact between the first contact part and the second contact part is smaller than a sum of the thickness of the first terminal in the third direction and a thickness of the second terminal in the third direction.

12. The connection structure according to claim 10, wherein the moving space is extended in the first direction, and the first direction and the second direction are orthogonal to each other.

13. A connection structure comprising:

a first terminal including a first contact part, the first contact part including a plurality of first projections or first recesses arranged at a first array pitch in a first direction and arranged at a second array pitch in a second direction, the second direction intersecting the first direction; and a second terminal including a second contact part, the second contact part being brought into contact with the first contact part while being opposed to the first contact part, the second contact part including a plurality of second projections or second recesses arranged at a third array pitch in the first direction and arranged at a fourth array pitch in the second direction when the second contact part is opposed to the first contact part, wherein one of the first array pitch and the third array pitch is equal to a first integral multiple of another, one of the second array pitch and the fourth array pitch is equal to a second integral multiple of another, and each of the first projections is fitted into a corresponding one of the second recesses, so that the first contact part is brought into contact with the second contact part.

14. A connection structure comprising:

a first terminal including a first contact part, the first contact part including a plurality of first projections or first recesses arranged at a first array pitch in a first direction and arranged at a second array pitch in a second direction, the second direction intersecting the first direction; and a second terminal including a second contact part, the second contact part being brought into contact with the first contact part while being opposed to the first contact part, the second contact part including a plurality of second projections or second recesses arranged at a third array pitch in the first direction and arranged at a fourth array pitch in the second direction when the second contact part is opposed to the first contact part, wherein one of the first array pitch and the third array pitch is equal to a first integral multiple of another, one of the second array pitch and the fourth array pitch is equal to a second integral multiple of another, and each of the first recesses is fitted to a corresponding one of the second projections, so that the first contact part is brought into contact with the second contact part.

* * * * *